No. 760,525. PATENTED MAY 24, 1904.
C. W. CROSSMAN.
DRILL.
APPLICATION FILED JUNE 3, 1903.
NO MODEL.
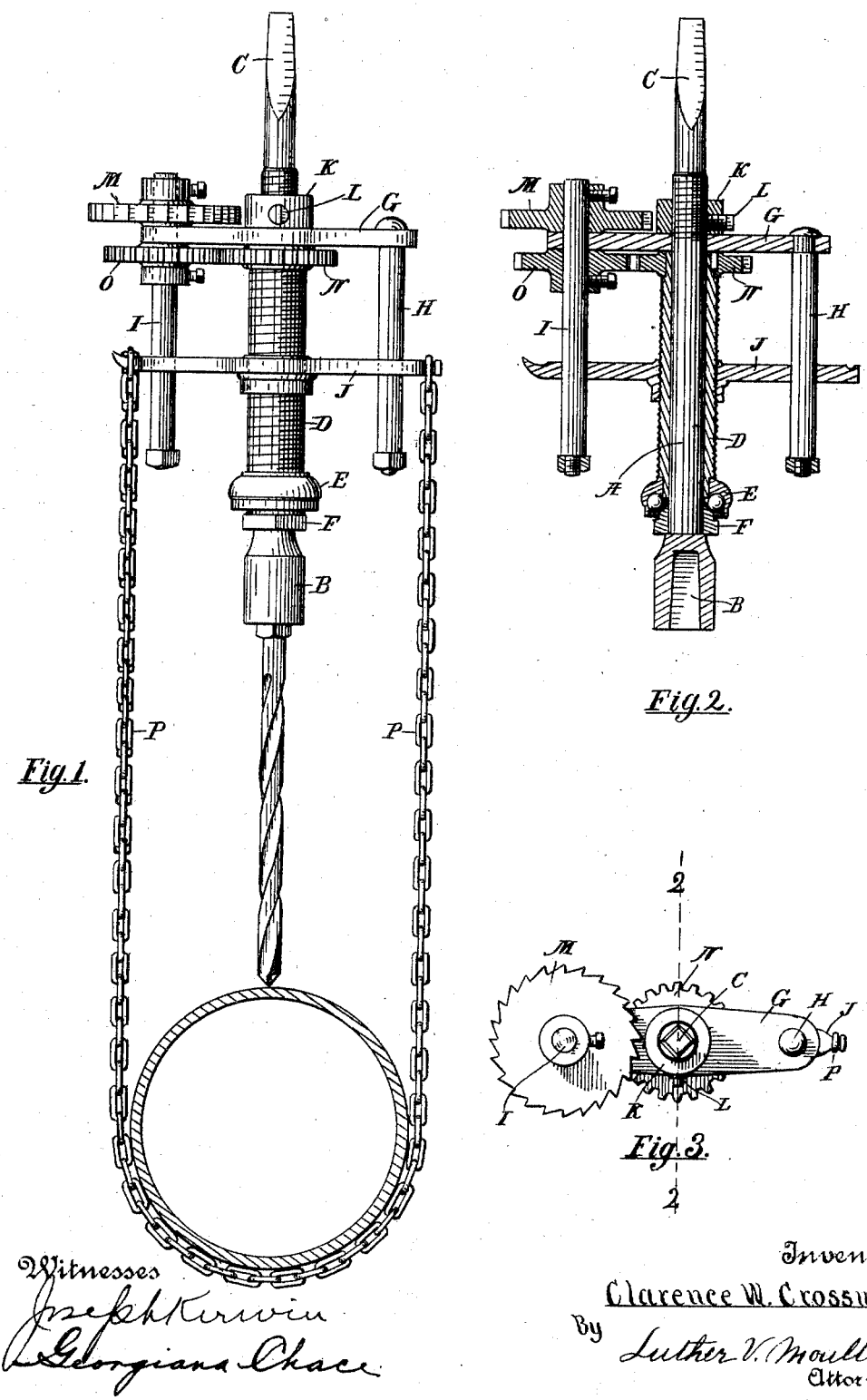
Witnesses
Joseph Kirwin
Georgiana Chace
Inventor
Clarence W. Crossman
By Luther V. Moulton
Attorney No. 760,525. Patented May 24, 1904.

UNITED STATES PATENT OFFICE.

CLARENCE W. CROSSMAN, OF GRAND RAPIDS, MICHIGAN, ASSIGNOR OF ONE-HALF TO VAL CRYDER, OF GRAND RAPIDS, MICHIGAN.

DRILL.

SPECIFICATION forming part of Letters Patent No. 760,525, dated May 24, 1904.

Application filed June 3, 1903. Serial No. 159,897. (No model.)

*To all whom it may concern:*

Be it known that I, CLARENCE W. CROSSMAN, a citizen of the United States, residing at Grand Rapids, in the county of Kent and State of Michigan, have invented certain new and useful Improvements in Drills; and I do hereby declare the following to be a full, clear, and exact description of the invention, such as will enable others skilled in the art to which it appertains to make and use the same.

My invention relates to improvements in manually-operated drills; and its object is to provide a device that is portable, that can be readily attached to any object that is to be drilled, to provide the same with automatic feed mechanism, to provide a device that may be manually operated by attaching thereto either an ordinary carpenter's brace or a crank, and to provide the device with certain new and useful features hereinafter more fully described, and particularly pointed out in the claims.

My device consists, essentially, of the combination and arrangement of parts hereinafter described, reference being had to the accompanying drawings, in which—

Figure 1 represents my device complete and attached to a pipe; Fig. 2, a vertical section of a part of the same on the line 2 2 of Fig. 3, and Fig. 3 a plan view of the same.

Like letters refer to like parts in all of the figures.

A is the drill-spindle, provided with a suitable socket B at one end to receive the drill and squared at the other end, as at C, to receive a brace or crank to rotate the spindle.

D is a sleeve in which this spindle is rotative. This sleeve is externally threaded and is inserted in a screw-threaded opening in the middle of the yoke J. To one end of this yoke is attached a chain P, and the other end of the yoke is provided with a suitable hook to engage the respective links of the said chain, whereby the yoke may be attached to any object to be drilled by passing the chain around the same and engaging it with said hook.

To provide a thrust-bearing for the spindle, a cup E is attached to the lower end of the sleeve and a cone F is provided on the spindle, between which cup and cone are inserted suitable balls. The cup E also forms a suitable head that may be used to manually rotate the sleeve. To automatically rotate the sleeve and force the drill forward, a gear N is fixed on the upper end of the sleeve, with which gear a gear O engages. This latter gear is actuated by means of a ratchet M, which ratchet in turn is operated by a tooth L, rotative with the spindle C. This tooth L consists, preferably, of a set-screw projecting from a collar K, longitudinally adjustable on the spindle to take up the wear of the thrust-bearing. The end of said screw is flattened, as shown, whereby this serves as a tooth to engage the ratchet and also to turn the screw and set the collar K. The ratchet M and gear O are mounted on a rotative shaft I, and to support this shaft in place I provide a bar G, arranged parallel with the yoke J and movable toward and from the same and having a central opening through which the spindle C extends. This bar is held from rotating with the spindle by means of a pin H, attached to one end of the bar and extending rigidly at right angles therefrom and longitudinally movable in an opening in the yoke J near one end thereof. The shaft I is journaled in the bar G and yoke J and is also longitudinally movable in the yoke.

The operation of the device is as follows: When attached, as shown in Fig. 1, the sleeve D may be manually rotated to tighten the chain P and start the drill, and thereafter as the spindle C is rotated the tooth L will at each revolution engage and move the ratchet M, whereby the sleeve will be regularly turned to force the drill forward a slight distance at each revolution.

Having thus fully described my invention, what I claim, and desire to secure by Letters Patent, is—

1. The combination of a yoke having a screw-threaded opening, means for attaching the yoke to an article to be drilled, a screw-threaded sleeve rotative in the opening of the yoke, a spindle rotative in the sleeve, a shaft rotative in the yoke, intermeshing gears fixed on the shaft and sleeve, and means for transmitting motion from the spindle to the shaft.

2. A yoke having a screw-threaded opening, means for attaching the yoke to an article to be drilled, a screw-threaded sleeve rotative in the opening of the yoke, a spindle rotative in the sleeve, a bar movable with the sleeve, a rod rigidly attached to the bar and longitudinally movable in the yoke, a gear fixed on the sleeve, a gear supported on the bar and engaging the gear on the sleeve, a ratchet connected to the last-named gear, and a tooth on the spindle to engage and turn the ratchet.

3. The combination of a yoke having a screw-threaded opening, a screw-threaded sleeve rotative in the said opening, means for attaching the yoke to an article to be drilled, a bar movable toward and from the yoke, a shaft attached to the bar and slidable in an opening in the yoke, intermeshing gears fixed on the shaft and sleeve, a ratchet on the shaft, a spindle rotative in the sleeve, and a tooth on the spindle to engage and turn the ratchet.

4. The combination of a yoke having a screw-threaded opening, means for attaching the yoke to an article to be drilled, a screw-threaded sleeve, a rod, and a shaft, each longitudinally movable in the yoke, a bar movable toward and from the yoke and supporting the rod and shaft, a spindle rotative in the sleeve and bar, a thrust-bearing between the sleeve and spindle, intermeshing gears on the sleeve and shaft, a ratchet on the shaft, an adjustable collar on the spindle, and a set-screw in the collar and forming a tooth to engage the ratchet.

In testimony whereof I affix my signature in presence of two witnesses.

CLARENCE W. CROSSMAN.

Witnesses:
    LUTHER V. MOULTON,
    GEORGIANA CHACE.